(12) United States Patent
Kim

(10) Patent No.: US 12,410,841 B2
(45) Date of Patent: Sep. 9, 2025

(54) ELECTROMECHANICAL BRAKE AND CONTROL METHOD THEREFOR

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 688 days.

(21) Appl. No.: 17/873,276

(22) Filed: Jul. 26, 2022

(65) Prior Publication Data

US 2023/0044940 A1 Feb. 9, 2023

(30) Foreign Application Priority Data

Aug. 5, 2021 (KR) .................. 10-2021-0103220

(51) Int. Cl.
*F16D 65/18* (2006.01)
*F16D 66/00* (2006.01)
*F16D 121/24* (2012.01)
*F16D 125/06* (2012.01)

(52) U.S. Cl.
CPC ........ *F16D 65/18* (2013.01); *F16D 2066/003* (2013.01); *F16D 2121/24* (2013.01); *F16D 2125/06* (2013.01)

(58) Field of Classification Search
CPC ........... F16D 2066/003; F16D 2121/24; F16D 65/18; F16D 2065/386; F16D 66/026; F16D 66/02; F16D 66/021; F16D 66/024; F16D 2123/00; F16D 2129/10; F16D 66/027;
(Continued)

(56) References Cited

U.S. PATENT DOCUMENTS

| | | | |
|---|---|---|---|
| 8,433,491 B2 * | 4/2013 | Burnett | B60T 7/042 303/166 |
| 8,833,526 B2 * | 9/2014 | Goto | B60T 13/741 188/72.1 |
| 10,125,834 B2 * | 11/2018 | Masuda | F16D 55/226 |

(Continued)

FOREIGN PATENT DOCUMENTS

| | | | | |
|---|---|---|---|---|
| CN | 103347755 A | * | 10/2013 | ............ B60T 13/162 |
| CN | 107662598 A | * | 2/2018 | ........... F16D 66/021 |

(Continued)

*Primary Examiner* — Robert A. Siconolfi
*Assistant Examiner* — Mahbubur Rashid
(74) *Attorney, Agent, or Firm* — Novo TechIP International PLLC

(57) ABSTRACT

According to at least one embodiment, the present disclosure provides an electromechanical brake comprising: a motor for generating driving force; a piston coupled to the motor and configured to be movable; a brake pad connected to the piston; a wheel disk configured to come into contact with the brake pad to generate a braking force; a sensor unit including a position sensor for measuring a position of the piston and a current sensor for measuring a current value flowing through the motor; and a control unit (ECU: Electronic Control Unit) which determines a limit current value of the motor according to the position of the piston, generates a braking force based on the position sensor within the limit current value, and generates a braking force based on the current sensor when out of the limit current value.

20 Claims, 5 Drawing Sheets

*100*

(58) Field of Classification Search
CPC ........... F16D 2500/3023; F16D 63/002; F16D 66/023; F16D 2125/06
See application file for complete search history.

(56) References Cited

U.S. PATENT DOCUMENTS

| | | | | |
|---|---|---|---|---|
| 10,138,964 B2* | 11/2018 | Lee | ...................... | F16D 55/226 |
| 10,946,846 B2* | 3/2021 | Kim | ........................ | B60T 7/042 |
| 2007/0052289 A1* | 3/2007 | Nilsson | .................. | F16D 66/02 |
| | | | | 303/155 |
| 2007/0235267 A1* | 10/2007 | Liebert | .................. | B60T 7/108 |
| | | | | 188/71.7 |
| 2011/0246039 A1* | 10/2011 | Takeda | .................. | F16D 65/18 |
| | | | | 701/70 |
| 2012/0089311 A1* | 4/2012 | Burnett | .................. | B60T 7/042 |
| | | | | 701/70 |
| 2012/0193177 A1* | 8/2012 | Goto | ...................... | F16D 65/18 |
| | | | | 188/161 |
| 2017/0321773 A1* | 11/2017 | Lee | ...................... | F16D 55/226 |
| 2018/0031065 A1* | 2/2018 | Shabbir | ................. | F16D 66/026 |
| 2018/0037208 A1* | 2/2018 | Englert | ................. | B60T 13/746 |
| 2021/0197777 A1* | 7/2021 | Itakura | ................. | B60T 13/746 |
| 2021/0394735 A1* | 12/2021 | Jang | ..................... | B60T 13/746 |

FOREIGN PATENT DOCUMENTS

| | | | | |
|---|---|---|---|---|
| CN | 110139787 A | * | 8/2019 | ............. B60K 31/08 |
| DE | 102008054853 A1 | * | 7/2010 | ............ B60T 13/745 |
| DE | 102011016126 A1 | * | 10/2012 | ............ B60T 13/741 |
| EP | 1985884 B1 | * | 10/2012 | ............ B60T 13/741 |
| JP | 6870149 B2 | * | 5/2021 | ............ B60T 13/662 |
| KR | 20200059973 A | * | 5/2020 | |

* cited by examiner (a)        (b)

ELECTROMECHANICAL BRAKE AND CONTROL METHOD THEREFOR

CROSS-REFERENCE TO RELATED APPLICATIONS

This application is based on, and claims priority from, Korean Patent Application Number 10-2021-0103220, filed on Aug. 5, 2021, the disclosure of which is incorporated herein by reference in its entirety.

TECHNICAL FIELD

The present disclosure relates to an electromechanical brake system and a control method therefor.

BACKGROUND

The description in this section merely provides background information related to the present disclosure and does not necessarily constitute the related art.

An Electro-Mechanical Brake (EMB) is a mechanical conversion of a conventional hydraulic brake into a mechanical type that does not need brake fluid, and adopts a method in which an electric motor installed on each wheel directly applies force to form a braking force.

The EMB was developed as an Electronic Parking Brake (EPB), but recently, its use has been expanded to work as a main brake replacing the conventional hydraulic brake. The EMB has a simpler structure than a hydraulic brake, has a superior braking response speed, and enables more precise control, thereby improving braking stability. The EMB is a device that has a brake caliper mounted with a motor-driven actuator, and generates a braking force by pressing a piston using a mechanism such as a screw without a medium called brake fluid. The EMB has a mechanism similar to that of the EPB, except that the EMB is mainly used for main braking and requires a higher braking response and operational durability than EPB.

The EMB measures a clamping force using a force sensor, and uses the same to form a target braking force required by a driver. However, when the force sensor is mounted, the design of a module including the sensor becomes complicated, the overall size of a brake system increases, and the manufacturing cost increases.

In addition to the method of measuring the braking force using the force sensor, the braking force may be measured using a position sensor. However, the method of measuring the braking force using the position sensor has an issue in that a brake pad, wheel disk, and caliper body thermally expand due to an increase in temperature caused by a repeated operation thereof, and thus a stiffness graph, which is the relationship between the position of the piston and the braking force, varies. Accordingly, when the braking force is measured using the position sensor, there is an issue in securing stable braking performance because an error occurs in the braking force.

SUMMARY

According to at least one embodiment, the present disclosure provides an electromechanical brake comprising: a motor for generating driving force; a piston coupled to the motor and configured to be movable; a brake pad connected to the piston; a wheel disk configured to come into contact with the brake pad to generate a braking force; a sensor unit including a position sensor for measuring a position of the piston and a current sensor for measuring a current value flowing through the motor; and a control unit (ECU: Electronic Control Unit) which determines a limit current value of the motor according to the position of the piston, generates a braking force based on the position sensor within the limit current value, and generates a braking force based on the current sensor when out of the limit current value.

According to at least one embodiment, the present disclosure provides a method for controlling an electromechanical brake, the method comprising: a driving process in which a motor is driven according to a braking signal, a piston coupled to the motor moves linearly, and a brake pad connected to the piston comes into contact with a wheel disk to generate a braking force; a limit current determination process of determining a limit current value of the motor according to a position of the piston; a current measurement process of measuring a current value of the motor according to the position of the piston; and a main control process of generating a braking force as much as a braking demand amount based on a position sensor when the current value of the motor measured in the current measurement process is within the limit current value.

DETAILED DESCRIPTION

Figure 1:
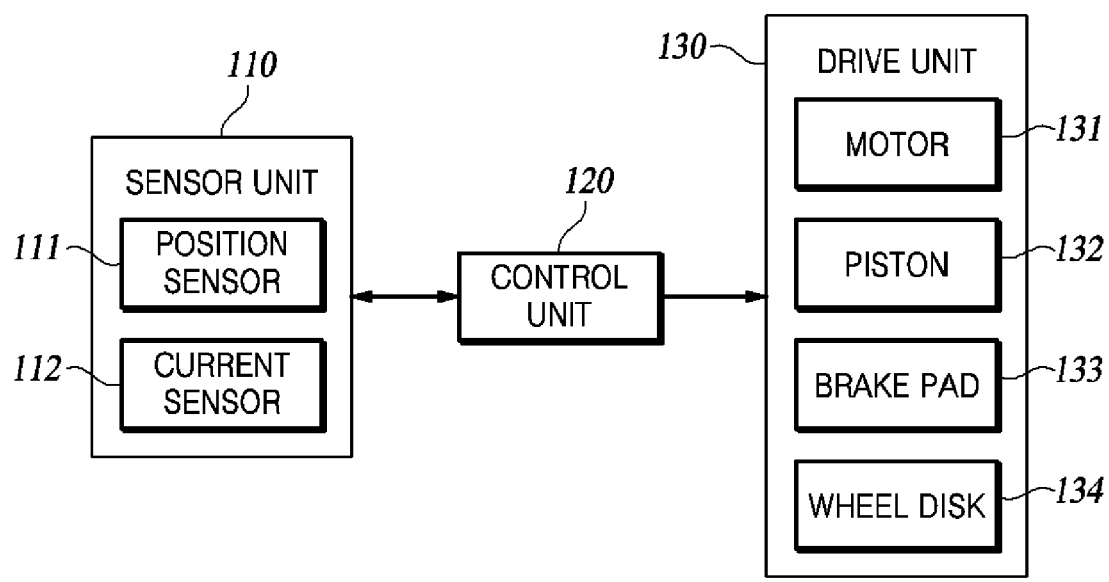
FIG. 1 is a block diagram of an electromechanical brake system according to an embodiment of the present disclosure.

An electromechanical brake system (simply "electromechanical brake" hereinafter) according to an embodiment may measure a braking force without a force sensor by using a position sensor and a current sensor.

The electromechanical brake according to an embodiment may reduce an error in a braking force measured without a force sensor by compensating for variability due to environmental factors such as temperature.

The aspects of the present disclosure are not limited to the foregoing, and other aspects not mentioned herein will be able to be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit,' 'module,' and the like refer to one or more units for processing at least one function or operation, which may be implemented by hardware, software, or a combination thereof.

FIG. 1 is a block diagram of an electromechanical brake according to an embodiment of the present disclosure.

Referring to FIG. 1, an electromechanical brake 100 according to an embodiment of the present disclosure may include all or part of a sensor unit 110, a control unit 120, and a drive unit 130.

The sensor unit 110 may include all or part of a position sensor 111 and a current sensor 112. The position sensor 111 may include a hall sensor (not shown) and an encoder (not shown) for measuring a rotational position of a rotor of a motor 131.

The drive unit 130 includes all or part of the motor 131, a piston 132, a brake pad 133, a wheel disk 134, and a gear box (not shown).

The motor 131 rotates in a forward or reverse direction as current flows to generate a driving force. The driving force means a rotational force of the motor 131. The gear box includes a plurality of gears and screws for linear motion of a spindle by the rotational force of the motor 131. In order to form a braking force, the rotational force of the motor 131 is transmitted to a screw of the gear box. As the spindle of the gear box performs a linear motion, the piston 132 moves forward or backward. As the piston moves forward or backward, the brake pad 133 connected to the piston presses the wheel disk 134 to form a braking force. Since a typical configuration related to the driving of the gear box in the present disclosure is a technique known to those skilled in the art, the illustration and description thereof will be omitted.

The control unit 120 determines whether braking is required for a vehicle. The determination of whether braking is required for the vehicle is made based on various factors, for example, a stroke of a brake pedal. When the control unit 120 determines that braking is required, the control unit 120 calculates a braking force needed to brake the vehicle. When the control unit 120 calculates the braking force, the drive unit 130 supplies a braking force corresponding to the calculated braking force to a plurality of wheel brakes. In the present disclosure, the control unit 120 may be an electronic control unit (ECU).

Since the conventional electromechanical brake 100 does not use hydraulic pressure, the actual clamping force was measured by assembling a force sensor inside a caliper body. Recently, a force sensor-less control based on the position sensor 111 has been proposed to secure price competitiveness. In order for the electromechanical brake 100 to generate a braking force, the brake pad 133 presses the wheel disk 134. Here, the force at which the brake pad 133 presses the wheel disk 134 is referred to as a clamping force. However, in the case of the force sensor-less control, when the brake pad 133, the wheel disk 134, and the caliper body thermally expand due to an increase in temperature caused by a repeated braking, a stiffness graph, which is the relationship between the position of the piston 132 and the clamping force, varies. The electromechanical brake 100 according to an embodiment of the present disclosure uses the position sensor 111 and the current sensor 112 to estimate a clamping force.

The position sensor 111 senses an angular position of the motor 131. The control unit 120 calculates a moving distance of the piston 132 using the angular position of the motor 131 sensed by the position sensor 111. The moving distance of the piston 132 according to the rotation angle of the motor 131 may vary depending on the design of the electromechanical brake 100.

Figure 2:
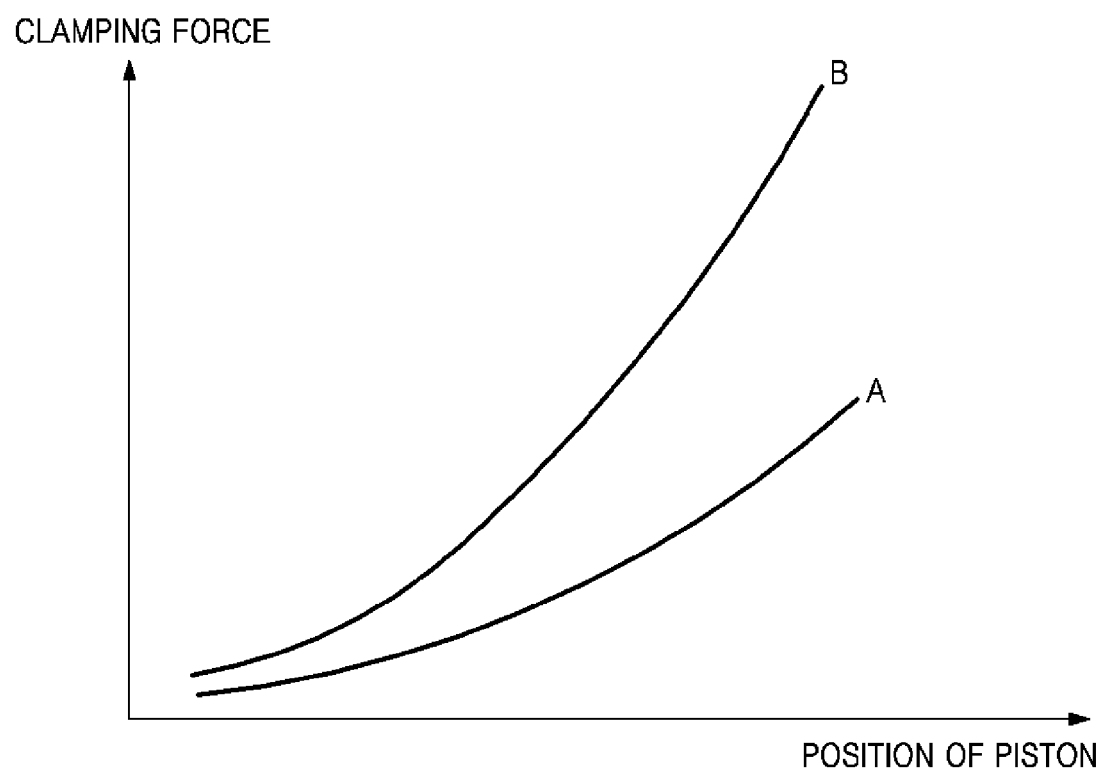
FIG. 2 is a graph illustrating a relationship between a position of a piston of an electromechanical brake system and a clamping force according to an embodiment of the present disclosure.

FIG. 2 is a graph illustrating a relationship between a position of a piston of an electromechanical brake and a clamping force according to an embodiment of the present disclosure.

Referring to FIG. 2, Line A is a graph showing a relationship between a position of the piston 132 and a clamping force in the initial state before being affected by environmental factors. Line B is a graph showing the variation of the relationship between the position of the piston 132 and the clamping force due to an increase in temperature caused by a repeated operation.

In the case of temperature among environmental factors, thermal expansion may occur in the brake pad 133, the wheel disk 134, and the caliper body as the temperature increases due to the repeated operation of the electromechanical brake 100. Since the brake pad 133, the wheel disk 134, and the caliper body each are made of different materials, the degree of expansion may also be different. As a result, the progress of the graph showing the relationship between the position of the piston 132 and the clamping force may vary due to repeated operation of the electromechanical brake 100. For example, the graph may vary from A to B in FIG. 2.

When the piston 132 is controlled by applying the same position according to a braking request without considering the variation of the relationship between the position of the piston 132 and the clamping force, the clamping force generated at the position of the piston 132 rises or falls. For example, when the temperature rises due to repeated operation of the electromechanical brake 100 and the brake pad 133 and the wheel disk 134 expand, even when the position of the piston 132 is controlled in the same way, a stronger clamping force is generated than in the initial state (A) (B). Accordingly, when the variation of the relationship between the position of the piston 132 and the clamping force is not taken into consideration, even when the position of the piston 132 is controlled the same as before the variation according to the braking request, a braking force greater than the initial state (A) may be generated (B).

The electromechanical brake 100 according to an embodiment of the present disclosure sets a limit current value for each position of the piston 132 in order to compensate for a variation of the clamping force at the position of the same piston 132 due to environmental factors such as temperature, and controls the same using this value.

Figure 3:
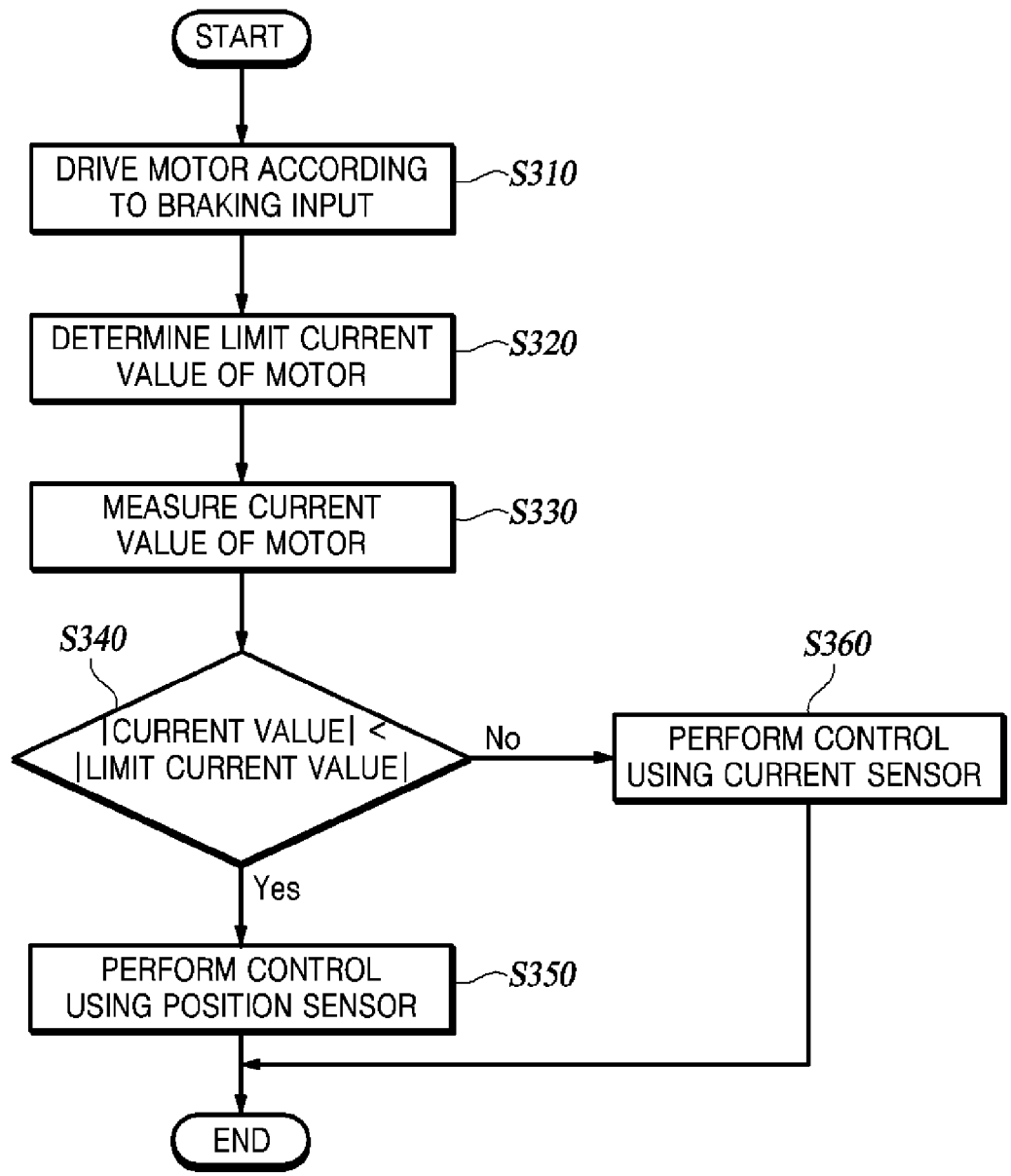
FIG. 3 is a flowchart illustrating a method for controlling an electromechanical brake system according to an embodiment of the present disclosure.

FIG. 3 is a flowchart illustrating a method for controlling an electromechanical brake according to an embodiment of the present disclosure.

Referring to FIG. 3, the motor 131 is driven according to a braking input (S310). As the motor 131 is driven, the piston 132 performs a linear motion by the operation of a plurality of screws and gears. As the piston 132 performs a linear motion, the brake pad 133 connected to the piston 132 presses the wheel disk 134.

The control unit 120 determines a limit current value of the motor 131 according to the position of the piston 132 (S320). The limit current value of the motor 131 may be determined experimentally or may vary according to repeated operation. A method of setting the limit current value of the motor 131 will be described in detail below.

The control unit 120 measures a current value of the motor 131 according to the position of the piston 132 (S330). The control unit 120 compares the measured current value with the limit current value determined according to the position of the piston 132 (S340). As a result of comparing the limit current value and the measured current value, when the current value of the motor 131 is within the limit current value, the control unit 120 controls the electromechanical brake 100 based on the position sensor 111 (S350). When the current value of the motor 131 deviates from the limit current value, the control unit 120 performs compensation control of the electromechanical brake 100 based on the current sensor 112 (S360).

Figure 4:
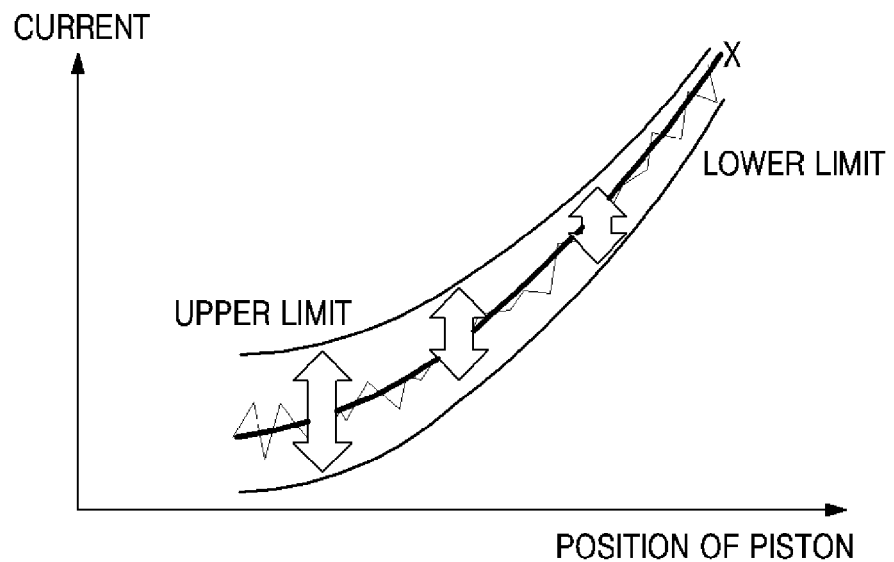
FIG. 4 is a graph illustrating a relationship between a position of a piston of an electromechanical brake system and a basic limit current value of a motor according to an embodiment of the present disclosure.

FIG. 4 is a graph illustrating a relationship between a position of a piston of an electromechanical brake and a basic limit current value of a motor according to an embodiment of the present disclosure.

Referring to FIG. 4, the current value varies non-linearly according to the position of the piston 132. Since the stiffness graph, which is the relationship between the position of the piston 132 and the clamping force, is non-linear, the current value proportional to the generated torque is also non-linear. The current value of the motor 131 includes noise. The line X of FIG. 4 is a curve approximately illustrating the current value of the motor 131 according to the position of the piston 132 as an average value of noise.

In the same way that the clamping force varies at the position of the same piston 132 due to environmental factors such as temperature in the electromechanical brake 100, the current value also varies at the position of the same piston 132.

Accordingly, referring to FIG. 4, a basic limit current value having a predetermined limit area may be set based on the current value (line X) of the motor 131 according to the position of the piston 132. The basic limit current value may be appropriately set in consideration of the change in operating efficiency of mechanical parts such as the brake pad 133, the wheel disk 134 and the caliper body and the noise variation factor of the current value. When setting the basic limit current value, the noise width of the current value is large and the sensitivity to the change in the clamping force is not large in the section where the clamping force is low (graph left side of FIG. 4), so it has a wide current limit area. In contrast, in the section where the noise width of the current value is small and the clamping force is large (the right side of the graph of FIG. 4), the sensitivity to change in the clamping force may be increased, so that the current limit area is narrow.

When a basic limit current value is set, basically, within the basic limit current value, precise control may be performed based on the position sensor 111. On the other hand, when the current value of the motor 131 deviates from the basic limit current value due to an increase in temperature caused by a repeated operation of the electromechanical brake 100, compensation control may be performed based on the current sensor 112.

Figure 5:
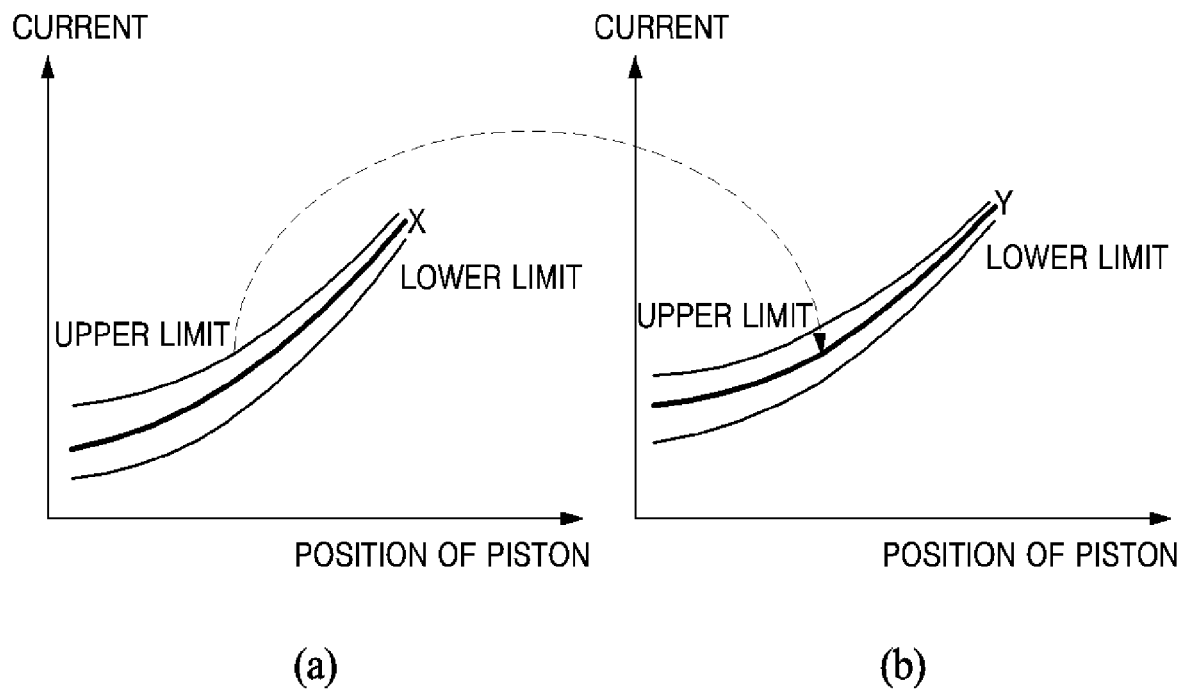
FIG. 5 is a graph illustrating a relationship between a position of a piston of an electromechanical brake system and a variation limit current value of a motor according to an embodiment of the present disclosure.

FIG. 5 is a graph illustrating a relationship between a position of a piston of an electromechanical brake and a variation limit current value of a motor according to an embodiment of the present disclosure.

Referring to FIG. 5, in the present disclosure, it is possible to minimize an error rate due to variations in environmental factors by narrowing the setting of the limit current value, and to vary the limit current value by accumulation according to the number of braking.

For example, at the time of initial braking, based on the current value (line X) of the motor 131 according to the position of the piston 132, it is set to have a variation limit current value of (+)/(−) 10%. At the time of second braking, based on the current value of the initial braking (line Y), not the set value (line X), it is set to have a variation limit current value of (+)/(−) 10%. Similarly, at the time of third braking, it is set to have a variation limit current value of (+)/(−) 10% compared to the second braking. In other words, the limit current value may vary depending on the number of braking. By varying the limit current value according to the number of braking, there is an advantage of increasing the precision of the control of the electromechanical brake 100. The initial braking point of time, which is the standard of the variation limit current value, may be reset at regular intervals.

FIG. 5(*a*) is a graph illustrating the current value (line X) and the variation limit current value of the motor 131 according to the position of the piston 132 at the time of initial braking. FIG. 5(*b*) is a graph illustrating the current value (line Y) and the variation limit current value of the motor 131 according to the position of the piston 132 at the time of second braking when the current value at the time of initial braking reaches the upper limit.

When the current value of the motor 131 is within a variation limit current value, precise control may be performed based on the position sensor 111. On the other hand, when the current value of the motor 131 deviates from the variation limit current value, compensation control may be performed based on the current sensor 112.

Figure 6:
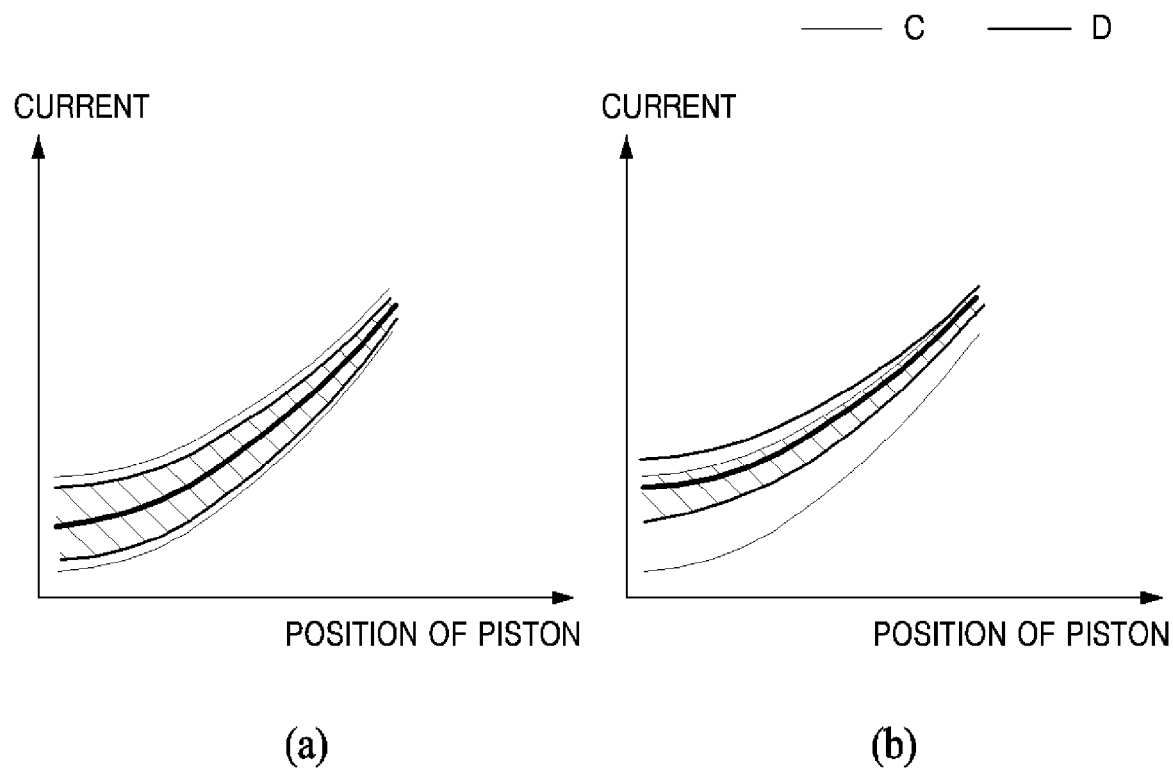
FIG. 6 is a graph illustrating a relationship between a position of a piston of an electromechanical brake system and a limit current value of a motor according to an embodiment of the present disclosure.

FIG. 6 is a graph illustrating a relationship between a position of a piston of an electromechanical brake and a limit current value of a motor according to an embodiment of the present disclosure.

Referring to FIG. 6, the limit current value may be set by combining the basic limit current value according to an embodiment of FIG. 4 and the variation limit current value according to an embodiment of FIG. 5. An embodiment of the present disclosure may set the limit current value by taking an intersection (overlap) portion of the basic limit current value and the variation limit current value.

Line C of FIG. 6 shows the basic limit current value of the motor 131 according to the position of the piston 132. Line D of FIG. 6 shows the variation limit current value of the motor 131 according to the position of the piston 132.

Referring to FIG. 6(*a*), during one-time braking, the basic limit current value (line C) of the motor 131 according to the position of the piston 132 includes a variation limit current value (line D). As a result, the variation limit current value (line D), which is the intersection of the basic limit current value (line D) and the variation limit current value (line D), becomes the limit current value (the portion indicated by hatching in FIG. 6(*a*)).

In the case of FIG. 6(*b*), the basic limit current value (line C) and the variation limit current value (line D) of the motor 131 according to the position of the piston 132 during two-time braking are shown. The basic limit current value (line C) does not change compared to one-time braking, but the variation limit current value (line D) changes based on one-time braking. When the intersection portion of the basic limit current value (line C) and the variation limit current value (line D) is found, the upper limit of the basic limit current value (line C) and the lower limit of the variation limit current value (line D) are common (the portion indicated by hatching in FIG. 6(b)). As a result, the common portion (the portion indicated by hatching in FIG. 6(b)) becomes the limit current value.

According to an embodiment of the present disclosure, since the previous braking state may not deviate from the basic limit current value (line C), intersection occurs in an embodiment of the present disclosure. As a result, based on the limit current value generated by the intersection, when the current value of the motor 131 is within the limit current value, precise control may be performed based on the position sensor 111. On the other hand, when the current value of the motor 131 deviates from the limit current value, compensation control may be performed based on the current sensor 112.

According to an embodiment, as the force sensor is removed from the electromechanical brake, the design of the electromechanical brake is simplified, the size thereof is reduced, and the manufacturing cost is reduced.

According to an embodiment, by compensating for variability due to environmental factors such as temperature, it is possible to improve the control precision of the electromechanical brake without a force sensor.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An electromechanical brake system comprising:
   a motor configured to generate a driving force;
   a piston coupled to the motor and configured to be movable;
   a brake pad connected to the piston;
   a wheel disk configured to contact the brake pad to generate a braking force;
   a position sensor configured to measure a position of the piston;
   a current sensor configured to measure a current value of the motor; and
   a control unit configured to:
      determine a limit current value of the motor according to the position of the piston;
      control the motor for generating the braking force based on the position of the piston measured by the position sensor when the current of the motor measured by the current sensor is within the limit current value; and
      control the motor for generating the braking force based on the current of the motor measured by the current sensor when the current of the motor measured by the current sensor is not within the limit current value.

2. The electromechanical brake system of claim 1, wherein the limit current value includes a basic limit current value preset according to the position of the piston.

3. The electromechanical brake system of claim 2, wherein the basic limit current value is set to have a predetermined limit area with respect to a preset current value of the motor according to a moving distance of the piston.

4. The electromechanical brake system of claim 3, wherein the limit area is set to become narrower as the position of the piston approaches the wheel disk.

5. The electromechanical brake system of claim 1, wherein the limit current value includes a variation limit current value set to be accumulated and varied according to an increase in a number of brakings by the electromechanical brake system".

6. The electromechanical brake system of claim 5, wherein the variation limit current value is set to have a predetermined limit area with respect to the current value of the motor according to the position of the piston at a time of the most recent braking by the electromechanical brake system.

7. The electromechanical brake system of claim 6, wherein the limit area is set to become narrower as the position of the piston approaches the wheel disk.

8. The electromechanical brake system of claim 1, wherein the limit current value includes a common portion between (1) a basic limit current value preset according to the position of the piston and (2) a variation limit current value set to be accumulated and varied according to an increase in a number of brakings by the electromechanical brake system.

9. The electromechanical brake system of claim 8, wherein the basic limit current value is set to have a predetermined limit area with respect to a preset current value of the motor according to a moving distance of the piston.

10. The electromechanical brake system of claim 8, wherein the variation limit current value is set to have a predetermined limit area based on the current value of the motor according to the position of the piston at a time of the most recent braking by the electromechanical brake system.

11. The electromechanical brake system of claim 9, wherein the predetermined limit area is set to become narrower as the position of the piston approaches the wheel disk.

12. A method for operating an electromechanical brake system, comprising:
   driving a motor according to a braking signal, which causes a piston coupled to the motor to move linearly and a brake pad connected to the piston to contact a wheel disk to generate a braking force;
   determining a limit current value of the motor according to a position of the piston;
   measuring a current value of the motor according to the position of the piston; and
   generating the braking force in an amount corresponding to a braking demand amount based on the position of the piston when the current value of the motor is within the limit current value.

13. The method of claim 12, further comprising generating the braking force by an amount corresponding to the braking demand amount based on the current value of the motor when the current value is not within the limit current value.

14. The method of claim 12, wherein determining the limit current value of the motor comprises determining a preset basic limit current value according to the position of the piston.

15. The method of claim 14, wherein determining the basic limit current value comprises setting the basic limit current value to have a predetermined limit area based on a preset current value of the motor according to a moving distance of the piston.

16. The method of claim 12, wherein determining the limit current value of the motor comprises setting a variation limit current value to be accumulated and varied according to an increase in a number of brakings by the electromechanical brake system.

17. The method of claim 16, wherein setting the variation limit current value comprises setting the variation limit current value to have a predetermined limit area based on the current value of the motor according to the position of the piston at a time of the most recent braking by the electromechanical brake system.

18. The method of claim 12, wherein determining the limit current value of the motor comprises determining a common portion between (1) a basic limit current value preset according to the position of the piston and (2) a variation limit current value set to be accumulated and varied according to an increase in a number of brakings of by electromechanical brake system.

19. The method of claim 18, further comprising setting the basic limit current value to have a predetermined limit area based on a preset current value of the motor according to a moving distance of the piston.

20. The method of claim 18, further comprising setting the variation limit current value to have a predetermined limit area based on the current value of the motor according to the position of the piston at a time of the most recent braking by the electromechanical brake system.

* * * * *